US008218851B1

(12) United States Patent
Cantley et al.

(10) Patent No.: US 8,218,851 B1
(45) Date of Patent: Jul. 10, 2012

(54) IDENTIFYING STORED DOCUMENTS BY EVALUATING IMAGE ATTRIBUTES

(75) Inventors: Kerry M Cantley, Fort Mill, SC (US); Kenneth R Cox, Mooresville, NC (US); Theresa A Haynes, Charlotte, NC (US); Ronald R Hollander, Walnut Creek, CA (US)

(73) Assignee: Bank of America Corporation, Charlotte, NC (US)

( * ) Notice: Subject to any disclaimer, the term of this patent is extended or adjusted under 35 U.S.C. 154(b) by 735 days.

(21) Appl. No.: 12/407,341

(22) Filed: Mar. 19, 2009

(51) Int. Cl.
*G06K 9/00* (2006.01)

(52) U.S. Cl. .......... 382/137; 382/139; 705/45

(58) Field of Classification Search .......... 382/137, 382/139; 705/45
See application file for complete search history.

(56) References Cited

U.S. PATENT DOCUMENTS

| | | | |
|---|---|---|---|
| 6,351,553 B1 * | 2/2002 | Hayosh | 382/139 |
| 7,225,975 B1 | 6/2007 | Cantley et al. | |
| 7,497,429 B2 * | 3/2009 | Reynders et al. | 271/2 |
| 7,717,329 B1 * | 5/2010 | Cantley et al. | 235/379 |
| 2008/0063253 A1 * | 3/2008 | Wood | 382/137 |
| 2009/0196485 A1 * | 8/2009 | Mueller et al. | 382/137 |

* cited by examiner

*Primary Examiner* — Jason M Repko
*Assistant Examiner* — Katrina Fujita
(74) *Attorney, Agent, or Firm* — Michael A. Springs; Moore & Van Allen, PLLC; Jeffrey R. Gray

(57) ABSTRACT

Stored documents can be recognized and identified by evaluation of their attributes from an image file to obtain a document specification that can be compared to stored data about the document. The image file is analyzed using a processor in order to discern image attributes. The image attributes form a specification for the document in the image. This specification can then be compared to the stored criteria using the processor, and the result of the comparison can be stored. An embodiment of the invention can be used in a check processing system for a financial institution. In such a case, the corresponding data comprises MICR data and the image attributes can, for example, indicate whether the document is a check in a carrier, as opposed a paper check by itself.

12 Claims, 4 Drawing Sheets

IDENTIFYING STORED DOCUMENTS BY EVALUATING IMAGE ATTRIBUTES

BACKGROUND

Financial institutions have established various processes related to the exchange of documents evidencing monetary transactions. Such documents have historically been encoded with magnetic ink so that information from the documents can be read by machine. Such documents have thus become known as magnetic ink character recognition (MICR) documents. The MICR information is sometimes called the MICR "codeline" since it appears in a line across the bottom of a check.

Check processing and sorting systems have also been developed in which a check or similar MICR document has its image captured and stored electronically. Such an image can be archived so that it is indexed with its accompanying data from the MICR read as well as additional information such as the capture date and time. In high-speed check processing, situations occur where the image of a check cannot be properly captured. In such situations, an image of a substitute document might be used. Alternatively, if the check is damaged, a check carrier may be used to pass the check through the check processing system.

SUMMARY

Embodiments of the invention provide a way to identify document types by interrogation of attributes from an image of the document. Information garnered in this process can than be compared to stored criteria obtained through other means, such as, in the case of checks, MICR data or cash letter data. In example embodiments, the image of the document and corresponding data describing the document are stored in a storage medium or storage media. The data includes the criteria to be used in the comparison. The image file is analyzed using a processor in order to discern image attributes. The image attributes form a specification for the document in the image. The attributes that make up the specification, can then be compared to the stored criteria using the processor, and the result can be stored. If the document specification obtained form the image file does not match the stored criteria, an exception process can take place. Reporting can also take place for comparisons that match, comparisons that don't match, or both.

An embodiment of the invention can be used in a check processing system for a financial institution. In one example of such a case, the corresponding data comprises MICR data and the image attributes indicate whether the document is a check in a carrier, as opposed a paper check by itself. In such an embodiment, document size attributes can be used for the image attributes. Where the image file is a tagged image file format (TIFF) file, the document size attributes can be obtained from the TIFF header.

A system used to implement an embodiment of the invention can include a computing platform to obtain image files corresponding to the documents, and provide the appropriate comparisons, for example, to stored characteristics information for the image. Storage media can be connected to the computing platform to store images, data, document attributes and the like. Computing resources that make up the system of the invention in combination with appropriate computer program code can provide the means to implement an embodiment of the invention by being executing on a processor to perform calculations and to maintain storage media encoded with image files, MICR data or other kinds of document criteria, and comparison results.

DETAILED DESCRIPTION OF THE INVENTION

Figure 1:
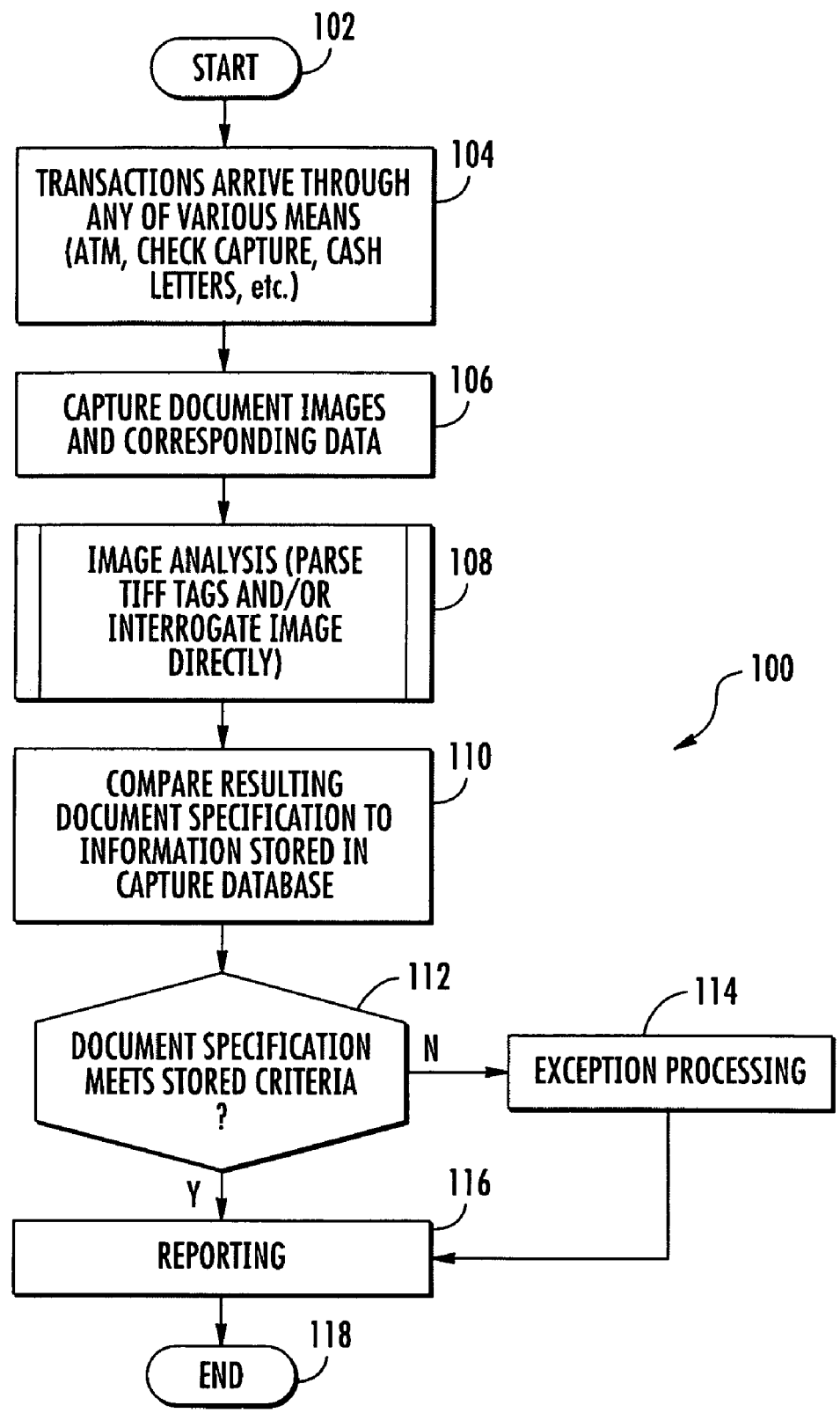
FIG. 1 is a flowchart illustrating the method of the invention according to at least one example embodiment.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical, semiconductor, or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executable and execute via the processor of the computer or other programmable data processing apparatus or platform, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "bank" or the synonymous term "financial institution" and any similar terms are used herein in their broadest sense. Financial institutions that process transactions and documents of the types discussed can include stock brokerages, credit unions, and other types of institutions which are not strictly banks in the historical sense. The term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses. Moreover, embodiments of the invention are not restricted to use with banks and financial documents. Even retail and other service businesses, as well as manufacturers may process documents and/or data as disclosed herein. The use of terms such as bank, "financial institution" or "franchise" herein is meant to encompass all such possibilities.

Much of the terminology herein refers to the processing of information about MICR encoded documents. This information can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). Such systems are well known within the banking industry by those who work in the financial data processing fields.

Check images and data about the checks the images represent, such as index information referring to the check images, which typically includes the MICR data, can be stored by processing systems according to any of various industry standard formats, for example, the well-known common import file format (CIFF). Such systems have been used for many years by many banks to archive check images. Images and index information in such a system can be stored in the same file or separated. In some environments, the index information is separated and stored in an electronic cash letter (ECL) for communicating between financial institutions for the purpose of settlement.

Index information can also be stored with electronic images in an "image cash letter" (ICL) to provide for the truncation of the paper documents. Again, these systems and techniques are well known by those of ordinary skill in the financial information technology arts. A well-known industry standard format for a cash letter file that contains both images and all data necessary to index and understand the images is the X9.37i format, which is promulgated by the American National Standards Institute (ANSI).

FIG. 1 shows a flowchart of a process according to example embodiments of the invention. Like most flowcharts, FIG. 1 illustrates process 100 as a series of process or sub-process blocks. Process 100 of FIG. 1 begins at block 102. At block 104, transactions arrive at a processing center computer system of the enterprise through any of various means. For example, in a financial institution, these transactions could come through ATM system, check capture, or via cash letters from other financial institutions, a central bank, or a clearing house. At block 106, images of items as well as corresponding data are "captured" in the system, for example, by being stored in appropriate storage media. At block 108, and image analysis process is carried out to identify a likely document specification for each document. An example process to identify carrier documents is further described below with reference to FIG. 2. The image analysis process could interrogate any of many different TIFF tags in the case where item images are in the TIFF format. Another example would be de-compressing an image file and determining light and dark areas to detect a pattern to support document recognition.

Still referring to FIG. 1, at block 110, the specified image attributes obtained from analysis process 108 are compared to stored criteria from another source (such as MICR data or cash letter data). If the image specification obtained from the image analysis is inconsistent with the stored criteria at decision block 112, exception processing 114 can be undertaken. Otherwise, processing proceeds directly to reporting at block 116. Exception processing can also be reported at block 116. Example process 100 ends at block 118.

The exception processing discussed above can include setting an indication of the status of an image. MICR information normally includes the various stored data fields, and what in CIMS and CPCS parlance is referred to as a "string." These stored strings can be used to indicate when an image has been inspected in the manner described above, and whether the image specification matches stored criteria. The exception can also be written to a database. Reporting can include storing, generating, printing, and/or transmitting information on the analysis and the workflow to be used for historical analysis and the like.

Figure 2:
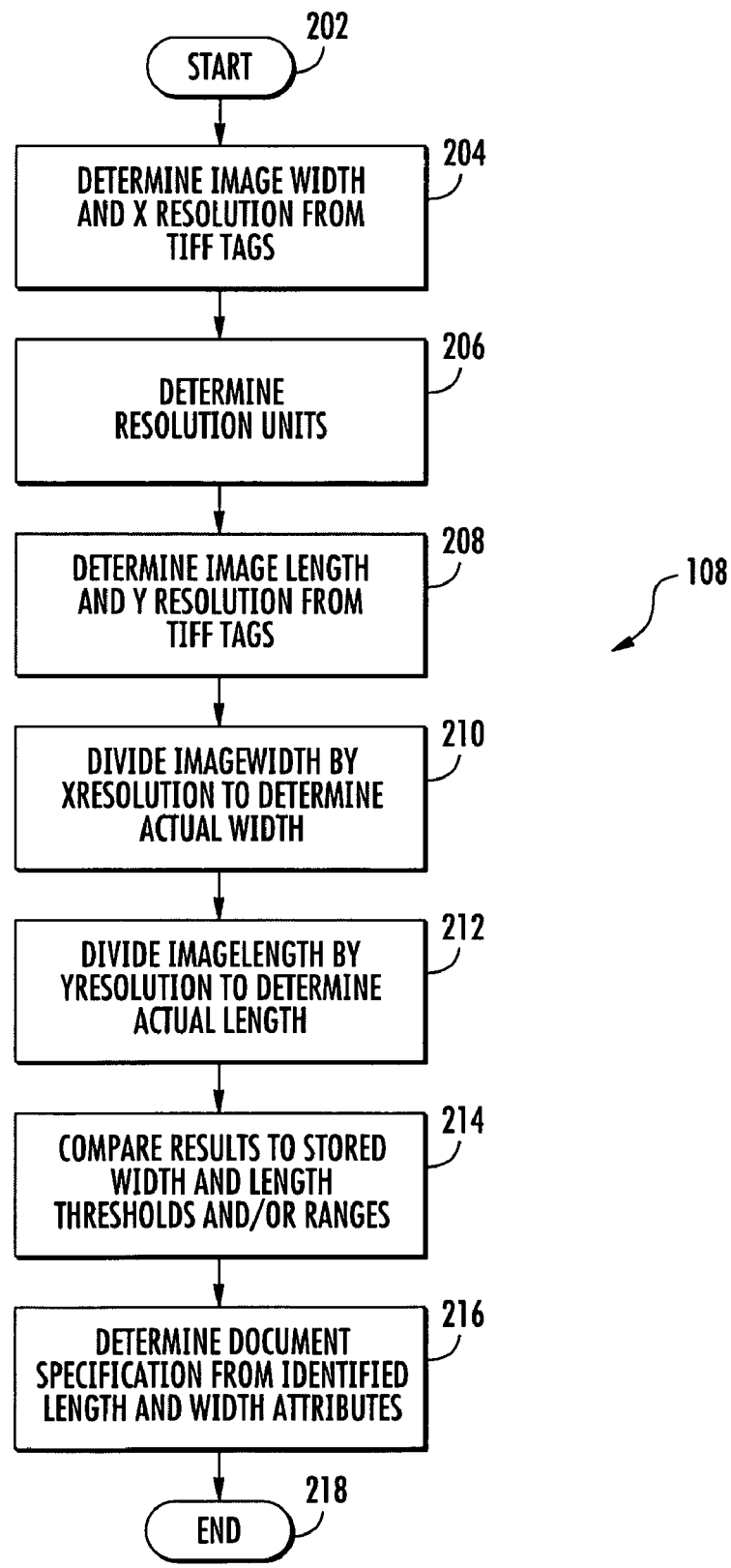
FIG. 2 is another flowchart illustrating further detail of at least one example embodiment of the invention.

Descriptive information can be embedded in the image of the document. A variety of techniques can be used to embed the data, which in example embodiments, includes posting information as well as the MICR codeline. For example, a standard tagged image file format (TIFF) image supports user tags, including tags for image length, image width, measurement units and resolution. FIG. 2 illustrates and image analysis process that can make use of these tags to determine when a check is in a check "carrier," which is a translucent envelope that allows a damaged check to be processed in high-speed check processing systems.

Some check carriers include a "3" in MICR position 44, however, some do not. Carrier documents in a check processing system can cause issues with image quality and also may need to be handled separately due to rules and pricing for clearing cash letters that contain carrier documents through the central bank (the Federal Reserve in the United States).

In the example embodiment of the invention used for check carrier document detection, tags embedded in the TIFF image of a check are used to make a determination as to whether the document meets the criteria for a carrier document as opposed to a check outside a carrier. The tags being used can include the ImageWidth TIFF tag, which is defined as tag number 256 in the TIFF standard and the ImageLength TIFF tag, which is defined as tag number 257 in the TIFF standard. The ImageWidth tag provides the number of rows of pixels in the image. While these tags provide the total number of pixels in the image width and length, to determine the actual size of the original object being imaged, the system must take into account the number of pixels per inch or centimeter.

The resolution or number of pixels per inch can be identified by use of the TIFF tags XResolution (standard TIFF tag number 282) and YResolution (standard TIFF tag number 283) as well as the ResolutionUnit tag. The XResolution value provides the number of pixels per inch or centimeter for the ImageWidth direction. The YResolution value provides the number of pixels per inch or centimeter for the ImageLength direction. The ResolutionUnit tag can be used to determine if the derived measurement is in units of inches or centimeters.

Turning to FIG. 2, an example process 108 from FIG. 1 is illustrated, and begins at block 202. At block 204, the image width ("X" direction) and width resolution are determined from TIFF header tags. At block 206, the resolution units are determined. At block 208, the image length ("Y" direction) and length resolution are determined from TIFF header tags. At block 210 of FIG. 2, the ImageWidth value is divided by the XResolution value to determine the actual width of the originally scanned item. This calculation provides the width of the object in the units defined in the ResolutionUnit tag. At block 212, the ImageLength value is divided by the YResolution value to determine the actual length of the originally scanned item. This calculation provides the length of the object in the units defined in the ResolutionUnit tag.

The system in example embodiments of the invention has the ability to programmatically set thresholds and range parameters based on items requested for validations and sample data applicable to that item. For example, for use in identification of carrier envelopes, widths are typically between 8.7 and 9 inches and height is typically greater than 4 inches. Still referring to FIG. 2, at block 214 the results of the above calculations can be programmatically compared to these width and length parameters. At block 216, a determination is made as to the probable document specification, for example, that the document is probably a check carrier envelope. This determination is stored and process 108 ends at block 218.

As previously suggested, embodiments of the invention are not limited to detecting carrier documents in a check processing system. Any items can be potentially identified uniquely by specific attributes. Embodiments of the invention can be used to identify, for example, non-MICR-encoded items such as credit/debit documents if attributes are unique. Any type of document that needs to be identified for processing or client reporting in any enterprise can be potentially identified.

Figure 3:
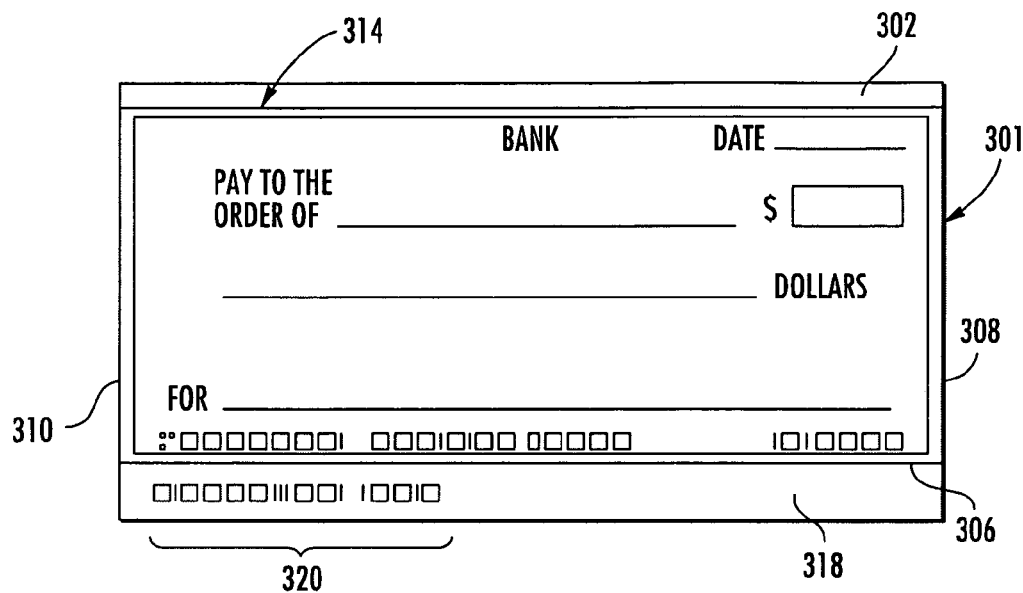
FIGS. 3 and 4 are examples of check carrier documents that can be identified by their image attributes according to some example embodiments of the invention.

Referring to FIG. 3, one example check carrier that can be detected by an embodiment of the invention is shown generally at 301 and consists of a translucent envelope consisting of a translucent front panel 302. The check carrier also has a translucent back panel (not visible) joined together along bottom edge 306 and side edges 308 and 310 to define an interior space for receiving a check 314. At the bottom edge 306 the front panel 302 and the back panel are joined by adhesive, sonic welding or the like to create a flat MICR area 318 that can receive MICR printing 320. MICR area 318 could also be created during an extrusion process for the front and back panels. The interior of check carrier 301 is dimensioned to closely receive a standard size check, such that movement of the check 314 within the carrier is limited.

Figure 4:
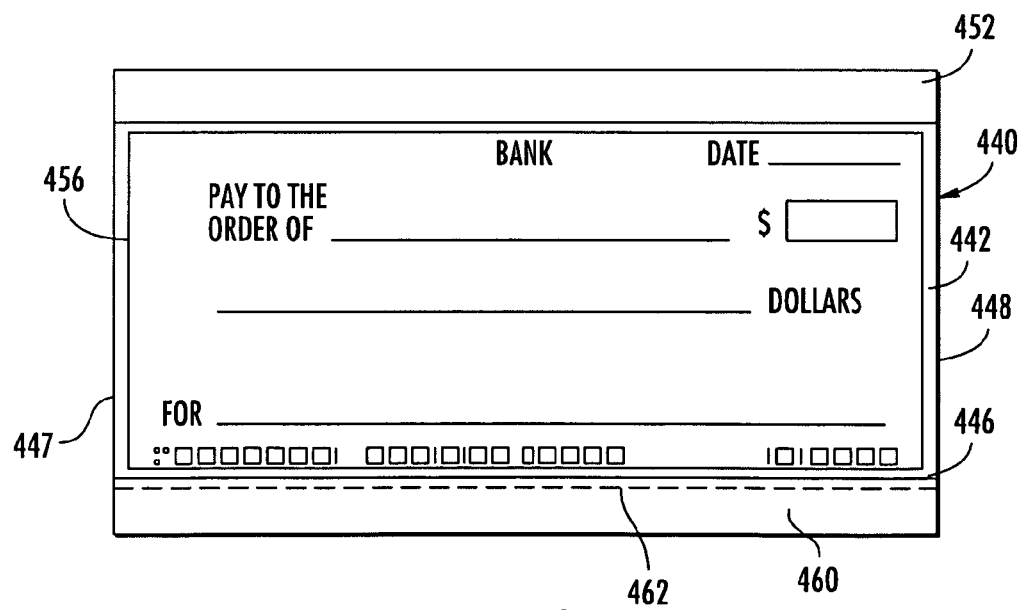

Referring to FIG. 4, a second example check carrier 440 is described and includes a front panel 442 secured to a back panel (not visible) along the bottom edge 446 and side edges 447 and 448 to create an interior space as previously described. The back panel is made slightly longer than front panel 446 such that an extended portion 452 of the back panel extends beyond the free edge of front panel 442. The extended portion 452 of the back panel facilitates the insertion of check 456 into the carrier. Carrier 440 includes a MICR area 460 for MICR printing as previously described. MICR area 460 is connected to the body of the check carrier at perforated line 462. Perforated line 462 allows the MICR area 460 to be easily separated from the check carrier if there is no need for the external MICR printing. The perforated line could be replaced by a score line or other weakened structure that would allow the MICR area 460 to be easily manually removed from the body of the check carrier.

It should be noted that as a practical matter, at least the length attribute thresholds and/or length criteria for the two types of check carriers just described will be significantly different from each other as well as different from those of a check by itself. Thus, using an embodiment of the invention one could identify not only a check in a carrier as distinct from a check alone, but also identify the type of carrier being used. Check carriers of the type described herein are further discussed in U.S. Pat. No. 7,225,975, the entire disclosure of which is hereby incorporated herein by reference.

Figure 5:
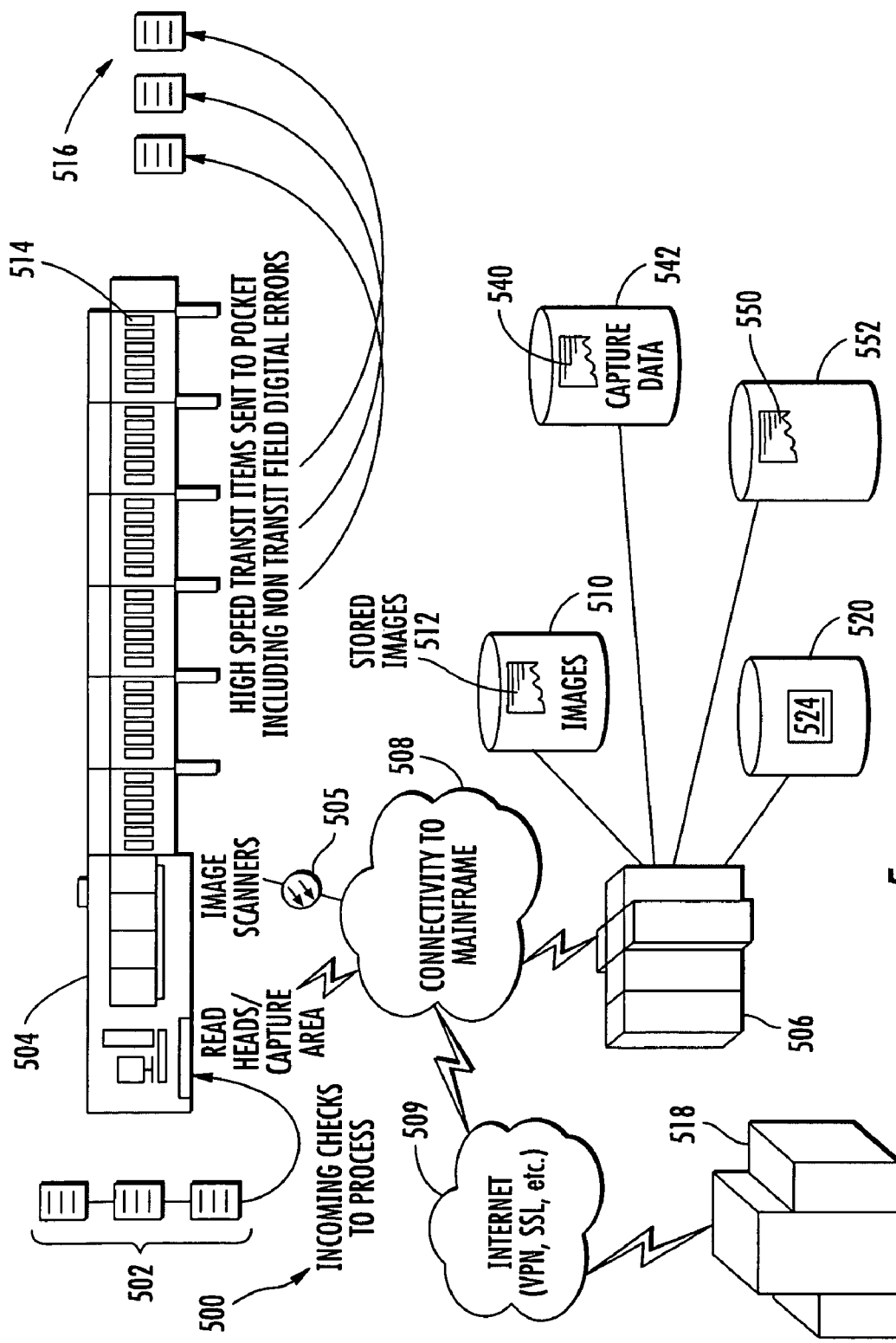
FIG. 5 is a system block diagram for example embodiments of the invention.

FIG. 5 provides detail of an example system and operating environment of some embodiments of the invention. In system 500 of FIG. 5, incoming paper items, in this case checks are shown at 502. The documents are sorted and read at a high-speed sorter, 504. The checks pass through a capture area where read heads capture the MICR data and organize it into stored fields. Images are captured and image and MICR data 505 is transmitted to computer system 506 via connectivity 508. In this example, computer system 506 is a mainframe computing platform. Connectivity 508 can be provided by any of various types of networks, for example, an internet protocol (IP) network, or a local area network (LAN). In this example, computer system 506 stores image files 512 in storage medium 510. The paper items, after they have been imaged, are sorted into pockets 514. Sorted, boxed items 516 are then stored, forwarded onto other banks, or otherwise properly routed within the financial institution. It should be noted that in some institutions using exclusively image-based processing, sorted items 516 might be simply stored and eventually destroyed.

Still referring to FIG. 5, connectivity 508 also provides a connection through external network 509 to other institutions 518. Images and data may be received directly from other institutions without dealing with paper checks. Files of images and data received in this way can be received via a secure connection such as a virtual private network (VPN) connection or a secure sockets layer (SSL) connection. It cannot be over emphasized that the system at FIG. 5 is provided as an illustrative example only. There are numerous types of document sorting systems that can be used to provide the appropriate functions. Most sorters typically have conventional document diverting mechanisms which rout the documents to various pockets. The sorter also captures MICR data, and scans the front and back of documents to capture the appropriate images. Although computing platform 506 in FIG. 5 is schematically illustrated as a "mainframe" computer, the computing platform could also be a server, workstation, or even a desktop or personal computer given the processing power that has been achieved in such devices in recent years.

In FIG. 5, another storage medium, 520, can include computer program code 524, which carries out at least a portion of an embodiment of the invention. Capture data, including for example, MICR data and/or stored document criteria 540 regarding the documents in the image files can be stored in storage medium 542. Document database 550 can reside on storage medium 552, and includes comparison information, reports on the image analysis undertaken, exceptions and the like. The storage media described herein can reside in multiple storage devices connected to computer system 506 via a network or networks, or connected directly to computer system 506. All databases and computer program code could also reside on a medium or media in a single storage device.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer implemented method of comparing document attributes from an image to stored criteria, the method comprising:
storing the image and corresponding data including the criteria in a storage medium, wherein the corresponding data comprise magnetic ink character recognition (MICR) data;
analyzing the image using a computing device processor in order to discern image attributes, the image attributes comprising an image width, an image length, and a resolution for pixels per unit measurement in the image;
determining a size for a document depicted in the image based on the image width, the image length, and the resolution;
comparing the size for the document to the stored criteria using the processor;
determining whether the document is a check in a carrier based on the comparison of the size for the document to the stored criteria; and
storing a result of the comparing of the size to the stored criteria in the storage medium.

2. The computer implemented method of claim 1 further comprising initiating an exception process when the result indicates that the size for the document does not match the stored criteria.

3. The computer implemented method of claim 1 wherein the image is a tagged image file format (TIFF) file and the image attributes are contained in a TIFF header.

4. A computer program product comprising computer-readable program code embodied on a non-transitory computer-readable storage medium, the computer-readable program code executable by a processor to implement a method of comparing document attributes from an image to stored criteria, the method comprising:
storing the image and corresponding data including the criteria in a storage medium, wherein the corresponding data comprise magnetic ink character recognition (MICR) data;
analyzing the image using a computing device processor in order to discern image attributes, the image attributes comprising an image width, an image length, and a resolution for pixels per unit measurement in the image;
determining a size for a document depicted in the image based on the image width, the image length, and the resolution;
comparing the size for the document to the stored criteria using the processor;
determining whether the document is a check in a carrier based on the comparison of the size for the document to the stored criteria; and
storing a result of the comparing of the size to the stored criteria in the storage medium.

5. The computer program product of claim 4 wherein the method further comprises initiating an exception process when the result indicates that the size for the document does not match the stored criteria.

6. The computer program product of claim 4 wherein the image is a tagged image file format (TIFF) file and the image attributes are contained in a TIFF header.

7. Apparatus for comparing document attributes from images to stored criteria, the apparatus comprising:
means for storing an image and corresponding data including the criteria in a storage medium, wherein the corresponding data comprise magnetic ink character recognition (MICR) data;
means for analyzing the image using a computing device processor in order to discern image attributes, the image attributes comprising an image width, an image length, and a resolution for pixels per unit measurement in the image;
means for determining a size for a document depicted in the image based on the image width, the image length, and the resolution using a portion of the processor that performs the size determination;
means for comparing the size for the document to the stored criteria using the processor;
means for determining whether the document is a check in a carrier using the processor based on the comparison of the size for the document to the stored criteria in the storage medium; and means for storing a result of the comparing of the size to the stored criteria in the storage medium.

8. The apparatus of claim 7 further comprising means for reporting the result of the comparing of the size to the stored criteria using a portion of the processor that performs reporting.

9. The apparatus of claim 7 wherein the image is in a tagged image file format (TIFF).

10. A system for comparing document attributes from images to stored criteria and storing a result, the system comprising:

a computing platform to analyze an image using a processor in order to discern image attributes, the image attributes comprising an image width, an image length, and a resolution for pixels per unit measurement in the image, to determine a size for a document depicted in the image based on the image width, the image length, and the resolution, to compare the size for the document to criteria using the processor, and to determine whether document is a check in a carrier based on the comparison of the size for the document to the stored criteria;

a first storage medium connected to the computing platform to store and provide access to the image as a file from among a plurality of files of images;

a second storage medium connected to the computing platform to store and provide access to the criteria; and a third storage medium connected to the computing platform to store a result of a comparison of the size for the document to the criteria.

11. The system of claim 10 further comprising a high-speed sorter connected to the computing platform to capture the images from the documents and store the images in files in a tagged image file format (TIFF).

12. The system of claim 10 wherein the image attributes are contained in a TIFF header.

* * * * *